US005428899A

United States Patent [19]

Radossi et al.

[11] Patent Number: 5,428,899

[45] Date of Patent: Jul. 4, 1995

[54] GAUGE FOR DETERMING THE POSITION OF A WORKPIECE WITHIN A FITTING

[75] Inventors: Sergio Radossi; Gregory Byrne, both of Ridgefield Park, N.J.

[73] Assignee: Hoke Incorporated, Cresskill, N.J.

[21] Appl. No.: 224,550

[22] Filed: Apr. 7, 1994

[51] Int. Cl.$^6$ .......................... B43L 13/00; G01B 3/20

[52] U.S. Cl. ........................................ 33/21.1; 33/613; 33/577; 33/529

[58] Field of Search ................. 33/529, 613, 666, 574, 33/577, 579, 21.1, 21.3

[56] References Cited

U.S. PATENT DOCUMENTS

| | | | |
|---|---|---|---|
| 2,009,671 | 7/1935 | Mueller et al. | 33/21.1 |
| 4,345,379 | 8/1982 | Pettingill, Jr. | 33/666 |
| 4,466,193 | 8/1984 | Astle | 33/21.1 |

*Primary Examiner*—Alvin Wirthlin
*Attorney, Agent, or Firm*—Stoll, Miskin, Previto & Hoffman

[57] ABSTRACT

A gauge for determining the position of a workpiece within a fitting. The gauge comprises a body portion having a reference plane, a wall spaced from the reference plane and a fitting-receiving assembly. A shaft receiving bore is provided in the body portion which extends inwardly from the reference plane to receive at least some of the fitting-receiving assembly. The fitting-receiving assembly has a fitting-receiving portion extending outwardly from the reference plane for receiving a fitting thereon. The fitting-receiving portion has an end spaced from the reference plane and is mounted for reciprocal movement within the shaft-receiving bore relative to the reference plane. A stop assembly is provided which is operatively associated with the fitting-receiving portion and is movable therewith. The stop assembly has stop means spaced inwardly from the end on the fitting-receiving portion. A marking bore is provided in the body portion which extends inwardly for the wall. The marking bore is adapted to receive a workpiece and marking means are provided in the body portion for marking the position of the workpiece within the marking bore.

13 Claims, 1 Drawing Sheet

GAUGE FOR DETERMINING THE POSITION OF A WORKPIECE WITHIN A FITTING

BACKGROUND

The present invention relates to a gauge and more particularly to a gauge for determining the accuracy of the position of a tube with a fitting such as a flareless tube fitting. The gauge is particularly adapted to permit inspection of flareless tube fittings with flareless tubes assembled therein to verify that the flareless tube fittings have been properly assembled and that the fitting is properly in place.

In assembling flareless tube fittings the extent to which a flareless tube is mounted within the fitting is extremely important and may be very critical to the proper operation of a particular piece of equipment. If the tubing is not properly located within the fitting, not only may the equipment malfunction, but there is also danger of leakage. The tubing may even be forced out of the fitting by pressure within the system which creates a dangerous situation for those operating the equipment.

OBJECTS

The present invention overcomes these disadvantages and has for one of its objects the provision of an improved gauge which permits visual verification that a tube is properly positioned within a fitting in accordance with the manufacturer's specification and assembly instructions.

Another object of the present invention is the provision of an improved gauge which may be easily used by assemblers of flareless tube fittings.

Another object of the present invention is the provision of an improved gauge which is inexpensive to manufacture and which may be used on tubes of various sizes.

Another object of the present invention is the provision of an improved gauge in which the accurate position of a tube within a fitting may be easily determined without using expensive equipment.

Other and further objects of the invention will be obvious upon an understanding of the illustrative embodiment about to be described, or will be indicated in the appended claims and various advantages not referred to herein will occur to one skilled in the art upon employment of the invention in practice.

DRAWINGS

A preferred embodiment of the invention has been chosen for purposes of illustration and description and is shown in the accompanying drawings forming a part of the specification, wherein:

FIG. 5 is a sectional view showing the tubing in position to be marked for proper positioning in the fitting shown in FIG. 4.

FIG. 6 is a side sectional view showing the marked tubing being inserted into the fitting.

FIG. 7 is a side sectional view showing the marked tubing inserted within the fitting.

FIG. 8 is a side sectional view showing the tubing in its final position with the fitting ready for verification that it is properly positioned within the fitting.

DESCRIPTION

Figure 1:
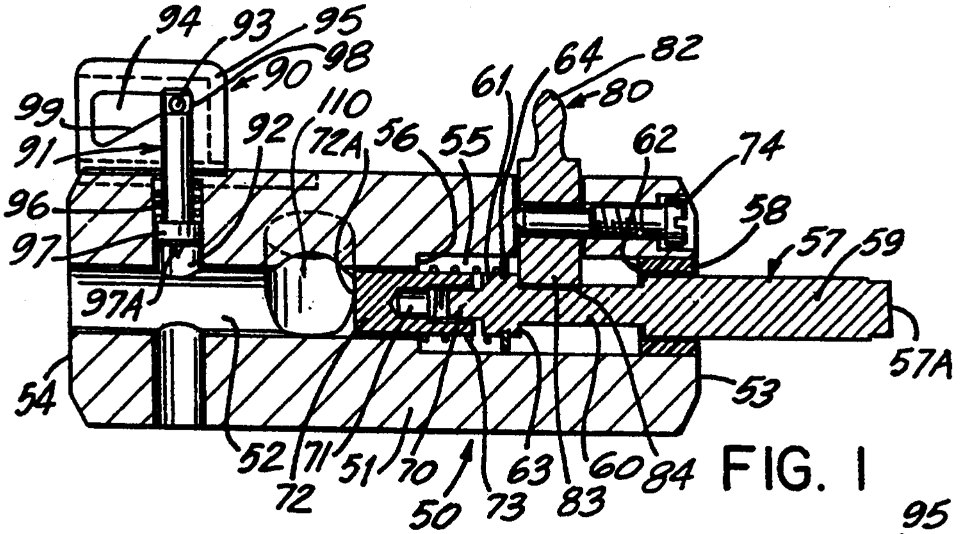
FIG. 1 is a cross-sectional view of a gauge made in accordance with the present invention.

Referring to the drawings and more particularly to FIGS. 6 to 8, the preferred fitting 1 into which a flareless tubing 2 is to be inserted comprises a body portion 3 having an axial bore 4 therewithin and having a rear edge 7 and a front edge 9. The body portion 3 has a hexagonally shaped nut portion 5 to permit the fitting 1 to be turned by a wrench or similar tool. A rear extension 15 of the body portion 3 of the fitting 1 extends rearwardly from nut portion 5 and is provided with threads 6 along its outer periphery. A front extension 10 of the body portion 3 extends forwardly from the nut portion 5 and is provided with threads 11 along its outer periphery to receive a threaded nut 12. In the embodiment shown in the drawing the rear portion 15 is of a greater diameter than the front portion 10. The hollow bore 4 expands to a larger bore 8 toward the front end 9 of the front portion 10 of the fitting 1 and forms a shoulder 35 with bore 4. The bore 8 flares outwardly at 16 toward the front end 9 of the front portion 10.

A first wedge member 20 is mounted within the nut 12 having a front body portion 21 with a front edge 41 and a rear tapered body portion 22 which is adapted to be inserted within the flared portion 16 of the bore 8 in the front body 10. The first wedge member 20 has a bore 23 which is approximately of the same diameter as the bore 8. The front portion 24 of the bore 23 is flared outwardly. A second shorter wedge 25 is provided between the wedge 20 and the nut 12. The second wedge 25 has a body 28, a front edge 29 and a bore 26 the same size as bores 23 and 8. It has a tapered portion 27 which fits into and under the flared portion 24 of the bore 23. The threaded nut 12 has an inner bore 30 having an inner thread 31 and is provided with front wall 32 with opening 34 therein and a nut portion 33. When the nut 12 is tightened, the nut 12, together with wedges 20–25, will be moved rearwardly within the flared portion 11 of the bore 8 and the flared portion 24 of the first wedge 20 to form a seal with a tube 2 mounted therein. This rear movement will also move a tube 2 rearwardly until it strikes shoulder 35.

The flareless tubing 2, or other workpiece, which is to be installed in the fitting 1, is a typical flareless tubing which may be made of copper or some other suitable material and which has a front end 36 and a rear end 37. Tubing 2 is adapted to be assembled onto the fitting 1 by being moved through the opening 34 in the nut 12 and through bores 23 and 26 in the first and second wedges 20 and 25, respectively, and into the bore 8 in front portion 10 of the fitting. When properly positioned within the fitting 1, the tubing 2 should rest with its front end 36 slightly spaced from the shoulder 35, as shown in FIG. 7. However, when the tubing 2 is first assembled, the tubing 2 should rest with its front end 36 slightly spaced from the shoulder 35 (FIG. 7). In this position, the nut 12 is tightened in order to move the nut 12 and its underlying wedges 23 and 25 rearwardly. The rear body portions 22 and 28 Of the first and second wedges 20 and 25 respectively, are pressed inwardly against the tubing 2 to hold the tubing 2 in place and to move the tubing 2 rearwardly until the front end 36 thereof strikes the shoulder 35. When the tubing 2 is against the shoulder 35 and held tightly by the wedge 20 and 25, the tubing 2 is fully and properly assembled within the fitting 1.

As discussed above, currently there is no simple manner of determining whether the tubing 2 is properly positioned within the fitting 1 with its front edge 36 against shoulder 35. With existing procedures, it is possible that the nut 12 may not have been tightened sufficiently so that the front edge 36 of the tubing 2 is not against the shoulder 35. The improper position of the tubing 2 in this manner may leave a gap which would cause the fitting 1 to leak, to malfunction or to be pushed out by pressure.

The gauge of the present invention overcomes this drawback and provides a reliable tool which may be used to positively determine that the tubing 2 is properly positioned within the fitting 1.

Figure 2:
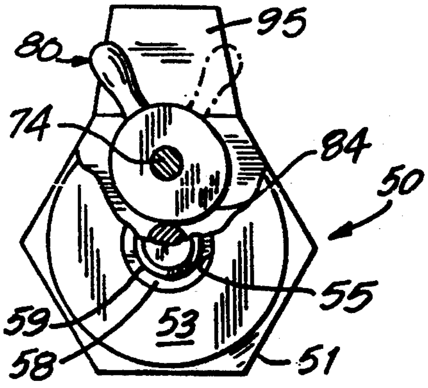
FIG. 2 is a broken away front elevational view thereof.
Figure 3:
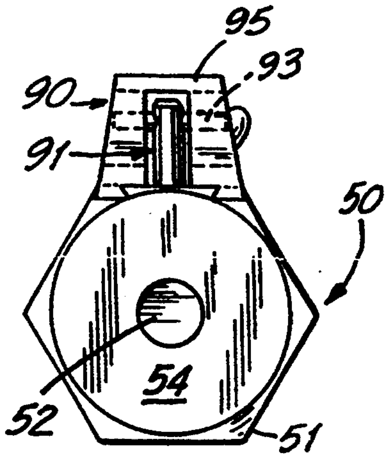
FIG. 3 is a rear elevational view thereof.

As shown in FIGS. 1 to 3, the gauge 50 of the present invention comprises a body portion 51 having a rear wall 53 which acts as a reference plane, a front wall 54 and a marking bore 52. The marking bore 52 expands into a larger bore 55 toward the rear wall 53 to form a shoulder 56 between bores 52 and 55. The larger bore 55 accommodates a fitting receiving shaft assembly 57 extending inwardly from the rear wall 53 and which is supported by a collar 58 at the rear wall 53. The shaft 57 assembly preferably has a fitting receiving portion 59 extending rearwardly from the rear wall 53, a central portion 60, and a front portion 61. The fitting receiving portion 59 of shaft assembly 57 terminates in a rear end 57A. The central portion 60 of the shaft assembly 57 is of reduced diameter and forms a rear shoulder 62 with the rear portion 59 at its rear end and also forms a front shoulder 63 with the front portion 61 at its front end. The front portion 61 of the shaft assembly 57 is preferably the same diameter as the rear portion 59 and has a retaining collar 64 mounted thereon.

The front portion 61 also has a reduced diameter tail portion 70 insertable into and preferably threadably mounted in a bore 71 located in a stop block 72 having front stop 72A which acts as a stop for tubing which may be mounted within the front bore 52. A spiral spring 73 is wrapped around the outer periphery of the block 72 and the front portion 61 of the shaft assembly 57 and is located between the shoulder 56 formed by the bores 52-55 and the retaining collar 64 on the front portion 61. Hence, the shaft assembly 57 can move forwardly against the spring 73 or backwardly under the influence of the spring 73. As indicated above, the tail portion 70 is preferably held fast in the bore 71 of the stop block 72 which is mounted within bores 52 and 55 and is of the same diameter as the front shaft portion 61 and the bore 52. Hence, reciprocal movement of the shaft assembly 57 will also result in reciprocal movement of the stop block 72.

A shaft lock assembly 80 is mounted in the body 50 by a screw 74 in the rear wall 53 around which the shaft lock assembly 80 pivots. The shaft lock assembly 80 is adapted to bear against the reduced portion 60 of the shaft assembly 57. The lock assembly 80 has a handle 82 and an arcuate lock portion 83 having an oblique curvature at 84 facing central shaft portion 60. When the shaft lock assembly 80 is moved in one direction the arcuate lock portion 83 will strike the central shaft portion 60 and lock the shaft assembly 57 in the position to which the shaft assembly 57 has been moved within the body portion 51 of the gauge 50. When the shaft lock assembly 80 is moved in the opposite direction, the arcuate lock portion 83 will release the shaft assembly 57.

The gauge 50 is provided with a scribing tool assembly 90. The scribing tool assembly 90 comprises a spring pressed scribing tool body 91 having a scribing head 97 (with scribing point 97A) positioned in a transverse bore 92 which communicates with and intersects the marking bore 52. A spiral spring 96 is provided around the body 91 above scribing head 97 and is normally biased to move the scribing head 97 and point 97A downwardly into the path of the marking bore 52. An arm 93 extends from and is inserted into a cam opening 94 in a retractable scribing button 95 which is movable back and forth along the top of the body 51. The cam opening 94 in the scribing button 95 has an upper front narrow portion forming an upper cam 98 and a lower rear wider portion forming a lower inclined ramp 99 which is below the upper cam 98. When the button 95 is moved in one direction (forwardly), the arm 93 of the scribing tool 91 is forced by the lower inclined ramp 99 to move upwardly against the action of spring 96 into the upper ram 98 thereby moving the scribing head 97 away from the tubing bore 52. When the scribing button 95 is moved in the opposite direction (rearwardly), the arm 93 is moved into the lower ramp 99 to release the scribing tool 91 so that the scribing tool 91 is forced down by the spring 96 to place the scribing head 97 and its point 97A into the path of marking bore 52.

As will be more fully discussed hereinafter, the distance between the rear end 57A of the shaft fitting receiving portion 59 and the rear wall 53 of the gauge body portion 59 is slightly greater than the distance between the front stop 72A of the block 72 and the scribing point 97A.

In operation, the scribing tool 91 is raised to the upper position by arms 93 riding up ramp 99 into upper cam 98 by pushing the scribing button 95 rearwardly (FIG. 1). This moves the scribing head 97 out of the marking bore 52. The handle 82 on the shaft lock 80 is placed in a position so that the portion 71 of the shaft 59 is free to move back and forth within bore 55 and is in its fully extended position beyond the front wall 53 of the gauge. This can be verified by pushing the shaft 57 into the body 51 and allowing it to return to its previous position under the action of the spring 73.

Figure 4:
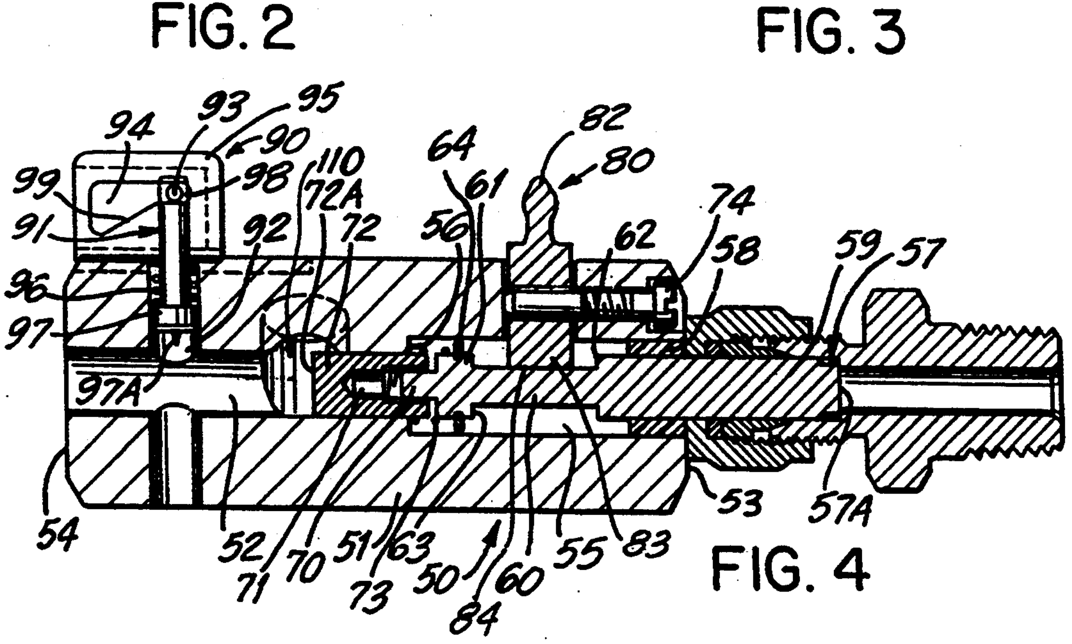
FIG. 4 is a sectional view showing a fitting in position to allow the gauge to determine where a tube should properly be positioned within the fitting.

The nut 12 on fitting 1 is loosened slightly (preferably approximately ½ turn). The fitting 1 is mounted onto the shaft assembly 57 of the gauge 1 and the nut 12 is finger tightened. The fitting 1 is then pushed against rear wall (reference plane) 53 of the gauge 50 until there is no gap between the rear wall 53 and the front wall 32 of the nut 12 (FIG. 4). This action moves the shaft assembly 57 together with the stop block 72 inwardly within bores 55-52 against the action of spring 73. The shaft assembly 57, and all of its associated parts, including stop block 72 is then locked in place by moving the handle 82 on the shaft lock assembly 80 to either side until the arcuate portion 83 strikes and holds the portion 60 of the shaft assembly 57 in place which in turn holds all of the associated parts of shaft 57 assembly in place, including stop block 72 (FIG. 4). In this position and even though the shaft assembly 57 has been pushed forward, the distance between rear end 57A and rear reference plane wall 53 is only slightly greater than the distance between scribing point 97A and block front stop 72A.

The tubing 2 is inserted into the marking bore 52 (FIG. 5) from the front until it reaches the front stop 72A of the block portion 72. The viewing window 110 is used to verify that the tubing 30 is fully inserted, i.e., no gaps between the front stop 72A and tubing 30. The scribing button 95 is then moved backward until the scribing tool 91 is placed with some force by the spring 96 onto the tubing 2, i.e., the point 97A of the scribing head 97 is forced against the tubing 2.

The guide body 50 is rotated relative to the tubing 2 so that the scribing head 97A places a mark 100 on the tubing surface 101. It will be noted that the mark 100 will be located a distance from the front edge 36 of the tubing 2 which is slightly less than the distance between the rear end 57A of the shaft 57 and the reference plane rear wall 53 of the body portion 51 of the gauge.

After the tubing 2 has been marked at 100, as described above, the tubing 2 is removed from the gauge 50 and the fitting 1 is likewise removed. The tubing 2 is then inserted into the fitting 1 through the front wall 32 of the nut 12 and into the bore 8 until it almost strikes the shoulder 35. It will be understood that the fitting 1 with which the tubing is placed is the same fitting that was used to set the parts of the gauge 50. It will be noted that the gap between the end 36 of the tubing 2 and the shoulder 35 (as shown in FIG. 7) is approximately the same as the difference in the distance between rear end 57A and reference plane 53 and the distance between front stop 72 and scribing point 97A. At this point, the mark 100 is not visible since it is within the nut 12. The nut 12 is then tightened (FIG. 7) in order to move it rearwardly and to cause the front portions of the wedges 20 and 25 to press against the outer wall 101 of the tubing 2 that the tubing 2 is also moved rearwardly until it strikes the shoulder 35. As the nut 12 is moved rearwardly, the marking 100 on the tubing surface 101 (FIG. 8) is exposed and becomes visible. When this happens, the user knows that the tubing 2 is fully inserted into the fitting 3.

It will be seen that the present invention provides an improved gauge which permits visual verification that a tube is properly positioned within a fitting in accordance with the manufacturer's specification and assembly instructions, which may be easily used by assemblers of flareless tube fittings, which is inexpensive to manufacture and which may be used on tubes of various sizes and which the accurate position of a tube within a fitting may be easily determined without using expensive equipment.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A gauge for determining the position of a workpiece within a fitting, said gauge comprising a body portion having a reference plane, a wall spaced from said reference plane, a fitting-receiving shaft assembly, a shaft receiving bore in said body portion extending inwardly from said reference plane to receive at least some of said fitting-receiving assembly, said fitting-receiving shaft assembly having a fitting-receiving portion extending outwardly from the reference plane for receiving a fitting thereon, said fitting-receiving portion having an end spaced from said reference plane, said fitting-receiving portion being mounted for reciprocal movement within said shaft-receiving bore relative to the reference plane, a stop assembly operatively associated with said fitting-receiving portion and movable therewith, said stop assembly having stop means spaced inwardly from the end of said fitting-receiving portion, a marking bore in said body portion extending inwardly from said wall, said marking bore adapted to receive a workpiece, and marking means in said body portion for marking the position of the workpiece within said marking bore.

2. A gauge as set forth in claim 1 wherein the distance between said marking means and said stop means is less than the distance between the reference plane and the end of the fitting-receiving portion.

3. A gauge as set forth in claim 2 wherein said stop assembly is movable within said marking bore.

4. A gauge as set forth in claim 3 wherein said stop assembly is mounted on said fitting-receiving shaft assembly.

5. A gauge as set forth in claim 4 wherein said shaft receiving bore and said marking bore are in substantially axial alignment with each other.

6. A gauge as set forth in claim 5 wherein spring means are provided to bias said fitting-receiving shaft assembly away from said marking bore.

7. A gauge as set forth in claim 6 wherein said stop means comprises a stop block at least partially positioned in said marking bore.

8. A gauge as set forth in claim 7 wherein lock means are provided to hold the fitting-receiving assembly in a predetermined position within the body portion.

9. A gauge as set forth in claim 8 wherein said marking means comprise a marking tool movable into the path of the marking bore.

10. A gauge as set forth in claim 9 wherein a second spring means are provided for said marking tool to bias the marking tool into the path of said marking bore.

11. A gauge as set forth in claim 10 wherein means are provided to move the marking tool out of the path of the marking bore against the action of said spring means.

12. A gauge as set forth in claim 11 wherein said moving means comprises a marking release button movable from a position retracting the marking means out of the path of said marking bore to a position permitting the marking means to enter said marking bore under the action of said second spring means.

13. A gauge as set forth in claim 12 wherein said marking means are movable in a further bore at an angle to said marking bore.

* * * * *